United States Patent [19]
Boundy

[11] 3,856,981
[45] Dec. 24, 1974

[54] POWER PANEL ARRANGEMENT
[75] Inventor: Bruce K. Boundy, Holland, Mich.
[73] Assignee: Westinghouse Electric Corporation, Pittsburgh, Pa.
[22] Filed: Aug. 28, 1973
[21] Appl. No.: 392,131

[52] U.S. Cl. .................................. 174/48, 160/135
[51] Int. Cl. ............................................... H02g 3/00
[58] Field of Search ........ 174/48, 49; 160/135, 127; 52/221, 173

[56] References Cited
UNITED STATES PATENTS

| | | | |
|---|---|---|---|
| 3,082,290 | 3/1963 | Ohmit | 174/49 |
| 3,194,361 | 7/1965 | Thurman | 174/48 |
| 3,609,211 | 9/1971 | Van Herk | 174/49 |
| 3,683,100 | 8/1972 | Deal | 174/48 |
| 3,719,768 | 3/1973 | Jonsson | 174/49 |

FOREIGN PATENTS OR APPLICATIONS
659,030  1/1965  Belgium .............................. 174/49

Primary Examiner—J. V. Truhe
Assistant Examiner—David A. Tone
Attorney, Agent, or Firm—B. R. Studebaker

[57] ABSTRACT

A power panel arrangement for a free standing, space dividing, wall panel system which includes, in combination, a ceiling panel for inclusion in a suspended ceiling system, a hollow space dividing wall panel of a space dividing wall panel system, and a flexible tube interconnecting the ceiling panel to the hollow space dividing wall panel. The flexible tube carries electrical and telephone service from the plenum area above the suspended ceiling to convenience outlets adjacent the lower portion of the hollow, space dividing wall panel.

12 Claims, 3 Drawing Figures

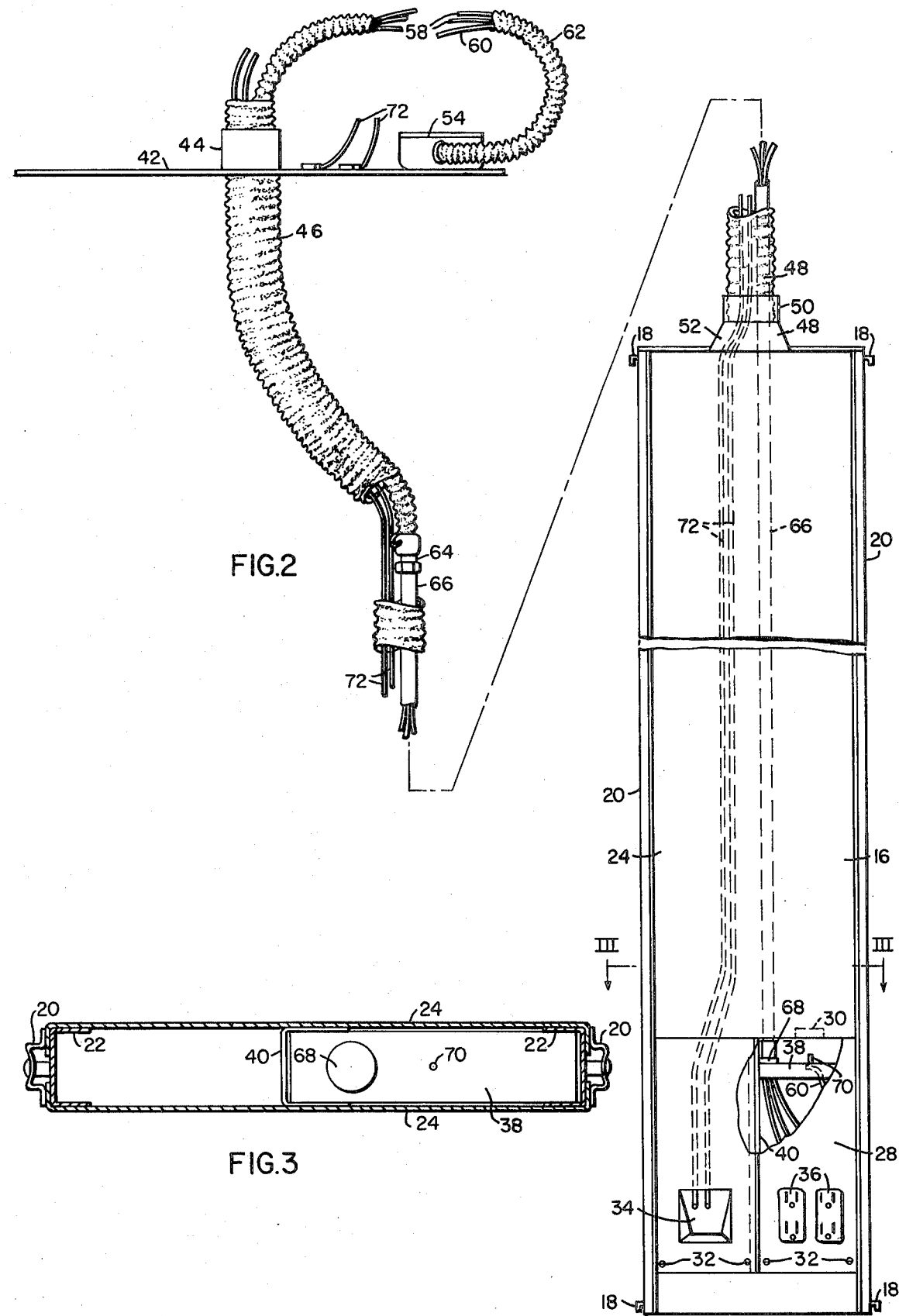

POWER PANEL ARRANGEMENT

BACKGROUND OF THE INVENTION

This invention relates to space dividing systems of the free standing, wall panel type generally connected with the "office landscaping" type arrangement for modern offices. More particularly, the invention relates to a power panel arrangement for providing electrical and telephone service to work stations in a comparatively mobile, free standing, space dividing wall panel system.

The modern concept of "office landscaping" provides tremendous flexibility in office planning and layout when the office building or office area comprises a large open space defined only by a ceiling, a floor and exterior walls. This comparatively large space is then subdivided by semi-portable, free standing, space dividing wall panel systems into a multitude of work stations, conference rooms and work areas, to suit the tenant. The wall panel systems are generally spaced a significant distance from the ceiling of the room to afford an open area concept, and in most cases, are raised slightly above the floor. The better space dividing wall panel systems, although being sturdy and giving a permanent appearance, are usually readily disassembled so that office layouts and arrangements can be easily reformed as office requirements change. A significant problem in the space dividing wall panel system is that of providing electrical and telephone service to the various work stations. The area can generally not be pre-wired because the office arrangement is neither set at the time of construction nor will it be permanent. Perimeter offices can of course be provided with electrical and telephone service in the conventional manner, but interior offices have been, in the past, provided with this service through unsightly wires running through hallways and across floors or freely dangling from a ceiling in a manner which detracts significantly from the overall office appearance.

The planum space above the false or drop ceiling is conventionally employed to mount the lighting fixtures, and in many instances, much of the air conditioning and heating equipment. Since electrical service is already available in the plenum area to serve the lighting fixtures, it can be considered as a possible source for electrical service to the office work stations. The problem here is, however, that since the top edge of the space dividing wall panel is generally several feet, as much as 5 to 6 feet, below the ceiling level, a plurality of dangling wires situated helter-skelter throughout a large open office space significantly detracts from the office decor. Additionally, electrical wires running along the top or down the sides of wall panels are not only unsightly, but can be dangerous.

SUMMARY OF THE INVENTION

In accordance with the present invention, the foregoing deficiencies of prior art arrangements are obviated by providing a power panel arrangement for free standing, space dividing, wall panel systems which includes in combination a novel ceiling panel and wall panel joined by a flexible plastic tube.

The power panel arrangement for a free standing, space dividing, wall panel system of this invention comprises in combination, a ceiling panel adapted to be disposed in a suspended ceiling system, said ceiling panel having an aperture therethrough. Below the ceiling panel is situated a hollow space dividing wall panel having a top edge adapted to be spaced a substantial distance below the ceiling panel with said top edge having an aperture therethrough communicating with the interior of the hollow space dividing wall panel. A flexible tube interconnects the aperture in the ceiling panel and the aperture in the top of the wall panel with the wall panel including at least one power outlet therein. An electrical junction box is secured to the topside of the ceiling panel and electrical conductors are connected to the junction box and extend from the junction box through the aperture in the ceiling panel, through the flexible tube and aperture in the top edge of the wall panel and are connected to the power outlet in the wall panel.

BRIEF DESCRIPTION OF THE DRAWING

Many of the attendant advantages of the present invention will become more readily apparent and better understood as the following detailed description of an exemplary embodiment is considered in connection with the accompanying drawings, in which:

FIG. 2 is a side elevational view of the power panel arrangement of this invention with a portion of the power panel broken away; and FIG. 3 is a sectional view along the line III—III of FIG. 2.

DESCRIPTION OF THE PREFERRED EMBODIMENT

Figure 1:
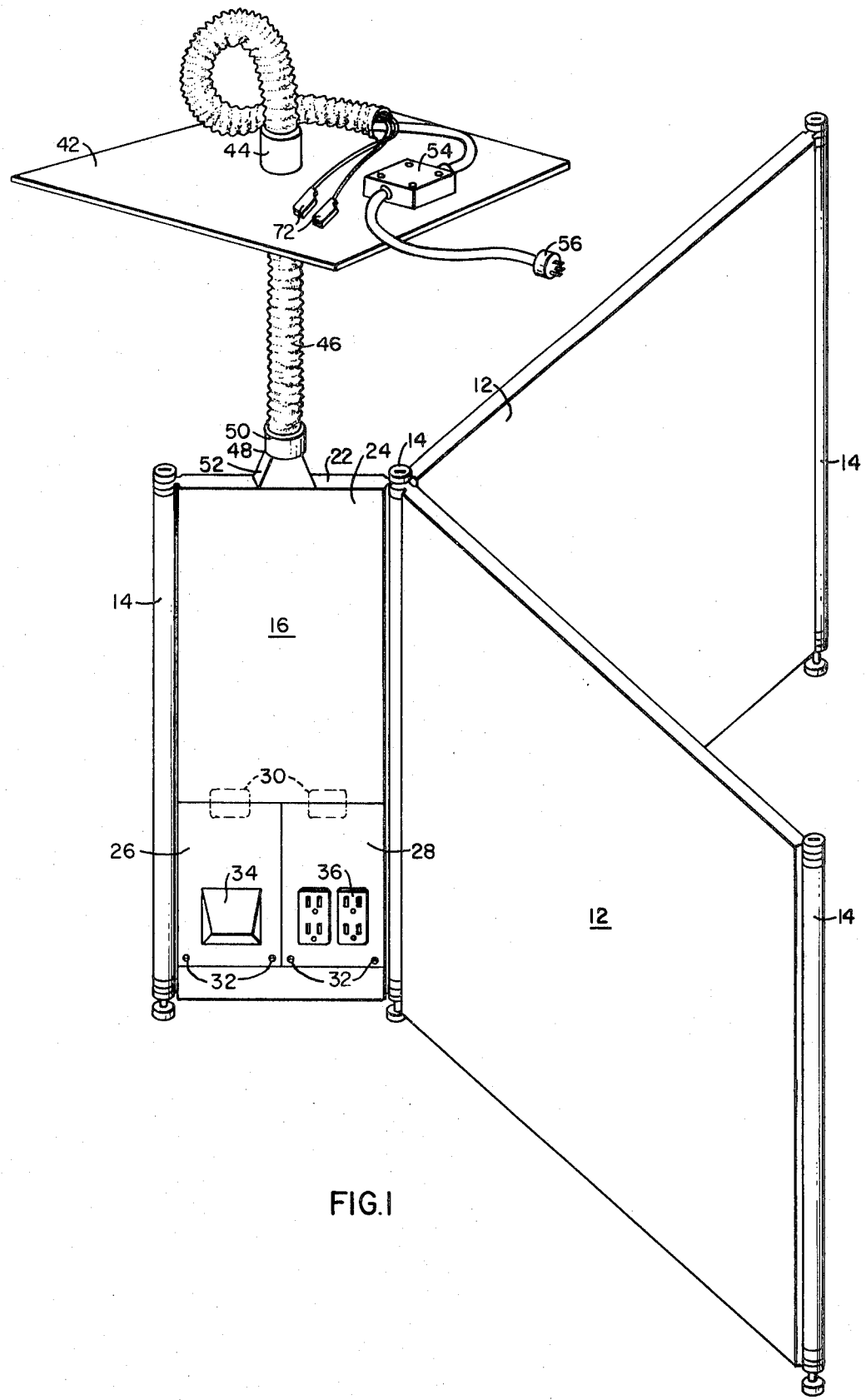
FIG. 1 is a perspective view illustrating the power panel arrangement of this invention in connection with a free standing, space dividing, wall panel system.

Referring now in detail to the drawing, wherein like reference characters represent like parts throughout the several views, there is illustrated in FIG. 1 the power panel arrangement of this invention connected to a free standing, space dividing, wall panel system. The space dividing system illustrated in FIG. 1 employs the space dividing system and connector assemblies disclosed in application Ser. No. 159,360 filed July 2, 1971 by W. C. Anderson et al for Space Divider System and Connector Assembly and Support Post Therefor. The space divider system disclosed therein includes space dividing wall panels 12 interconnected and supported by a plurality of connector assembly and support posts 14. The power panel 16 which forms a part of this invention includes connector hooks 18 (FIG. 2) on slotted standard side edge rails 20 which are compatible with that system. The conventional space dividing panels 12 are usually a standard framed honeycomb core coated with a high pressure decorative laminate. The power panel is somewhat differently constructed because of the requirement of carrying electrical conductors. The frame for the power panel is constructed from U-shaped steel channels 22 (FIG. 3) which are covered front and back by planar steel side walls 24. The planar steel side wall panels 24 may extend for the entire length of one side of the power panel or may on one or both sides be terminated below the middle of the panel with the bottom part of the panel being enclosed by a separate telephone cover plate 26 and an electrical service cover plate 28. The telephone and electrical service cover plates 26 and 28 are removable and include securing tabs 30 which are welded to the back side thereof and are adapted to slip behind the planar wall panel 16 while the bottom of the cover plates is threadedly secure to the bottom frame channel through fasteners 32. As will be apparent, the telephone cover plate includes a baffle opening 34 thereon providing access to the telephone cables while the electrical service cover plate 28 includes conventional electrical service convenience outlets 36 on the face thereof. The power panel may include cover plates 26 and 28 on each side thereof.

In order to avoid the necessity of a separate electrical box to be mounted within the power panel at the location of the convenience outlets 36, an electrical service box is provided in the structural framework of the power panel itself. As will be seen in FIGS. 2 and 3, a horizontal U-shaped steel channel member 38 intersects a vertical U-shaped channel member 40 to form, in conjunction with a portion of the side and bottom frame members 22, the side walls of a built-in electrical box.

The above described power panel of this invention is connected to and forms in combination with a 2 foot × 2 foot steel ceiling tile 42 the power panel arrangement of this invention. The ceiling tile 42 can occupy any position in a ceiling grid arrangement of the conventional type lay-in ceiling. The ceiling tile 42 has an aperture therethrough surrounded by a sleeve 44. The sleeve 44 has extending therethrough a 2 inch diameter flexible plastic tube 46 which is connected into a hollow transition member 48 mounted in the top edge of the power panel 16. The transition member 48 has a cylindrical section 50 which receives the plastic tube and a funnel-shaped tapered rectangular portion 52 with the tapered rectangular portion having its flared end mounted in an opening or aperture in the top edge of the power panel.

In addition to the sleeve 44, a wiring or junction box 54 is mounted to the topside of the ceiling tile 42, and can be adapted to receive building electrical service in any of many conventional manners including the male convenience plug 56 illustrated in FIG. 1. The electrical service wiring 58 including ground wire 60 is conventional No. 12 wiring and is fed from the box 54 through one half inch flexible metal conduit 62 into and through the flexible plastic tube 46 to a connection at 64 where it then travels through rigid metal conduit 66 to the top of the built-in box defined by the power panel frame 22 and the U-shaped channel members 38 and 40 at 68. In lieu of the connection at 64 the flexible metal conduit 62 may extend through the rigid metal conduit 66 and connect directly to the built-in electrical box. A ground wire connection is provided at 70 for the ground wire 60.

Along with the electrical service, telephone service through telephone cables 72 is carried through the plastic tube, the aperture in the ceiling panel 42 down to the transition member 48 where it enters the power panel and extends downwardly through the power panel to the baffle opening 34 at the base of the telephone cover plate 26. It should be noted that, although the electrical service and the telephone service both run through the plastic tube and the power panel, they are continuously separated from each other, either by the 1/2 inch flexible conduit 62 or the thin-walled conduit 66, or both, until the electrical service wires 58 and ground wire 60 enter the built-in junction box provided in the lower right-hand corner of the power panel.

As will be apparent from the foregoing, the power panel arrangement of this invention is readily compatible for use in combination with the free standing, space dividing, wall panel system disclosed in application Ser. No. 159,360, filed July 2, 1971 now U.S. Pat. No. 3,762,116 for Space Divider System and Connector Assembly Therefor as well as in conjunction with a conventional drop or suspended ceiling of the type used in the majority of new office construction. Additionally, the combination ceiling panel, flexible tube and hollow space dividing wall panel is readily freely-locatable in a modern office system and provides office workers with ready access to electrical service and telephone service at their work stations with a minimum of aesthetic distraction.

What is claimed is:

1. A power panel arrangement for a free standing, space dividing, wall panel system comprising, in combination,
   a ceiling panel adapted to be disposed in a suspended ceiling system, said ceiling panel having an aperture therethrough;
   a hollow space dividing wall panel having a top edge adapted to be spaced a substantial distance below said ceiling panel, said top edge having an aperture therethrough communicating with the interior of said hollow space dividing wall panel;
   a flexible tube interconnecting the aperture in said ceiling panel and the aperture in the top edge of said wall panel, and
   at least one power outlet in at least one wall of said space dividing wall panel.

2. A power panel arrangement according to claim 1 wherein an electrical junction box is secured to the topside of said ceiling panel and electrical conductors, connected to said junction box, extend from said junction box through said aperture in said ceiling panel, said flexible tube and said aperture in the top edge of said wall panel and are connected to said at least one power outlet.

3. A power panel arrangement according to claim 2 wherein said wall panel has at least one baffle opening in at least one wall thereof and said combination further includes telephone cables extending from the topside of said ceiling panel through said aperture in said ceiling panel, said flexible tube and said aperture in the top edge of said wall panel, said telephone cables terminating at said at least one baffle opening in said wall panel.

4. A power panel arrangement according to claim 3 wherein a metal conduit surrounds said electrical conductors and extends from said electrical junction box on said ceiling panel through said flexible tube and into said wall panel, separating said electrical conductors from said telephone cables.

5. A power panel arrangement according to claim 1 wherein a hollow transition member having a rectangular end defining a rectangular opening at one end and a cylindrical end defining a cylindrical opening at the other end is mounted in the aperture in said top edge of said wall panel, said rectangular end of said transition member communicating with the aperture in the top edge of said wall panel and said cylindrical end receiving one end of said flexible tube.

6. A power panel arrangement according to claim 1 wherein said hollow wall panel includes a frame and a pair of planar side walls; a pair of intersecting channel members forming a box with one corner of said frame in one corner of said hollow wall panel, said at least one power outlet being surrounded by said box.

7. A power panel arrangement for a free standing, space dividing, wall panel system comprising, in combination,
   a ceiling panel adapted to be disposed in a suspended ceiling system, said ceiling panel having a sleeved aperture therethrough;
   a hollow space dividing wall panel constructed from U-shaped metal channels forming a frame and planar metal side walls, said panel having a top edge adapted to be spaced a substantial distance below said ceiling panel, said top edge having an aperture therethrough communicating with the interior of said hollow space dividing wall panel;
   a flexible tube interconnecting the sleeved aperture in said ceiling panel and the aperture in the top edge of said wall panel, and
   at least one power outlet in at least one side wall of said space dividing wall panel.

8. A power panel arrangement according to claim 7 wherein an electrical junction box is secured to the topside of said ceiling panel and electrical conductors, connected to said box, extend from said box through said sleeved aperture in said ceiling panel, said flexible tube and said aperture in the top edge of said wall panel and are connected to said at least one power outlet.

9. A power panel arrangement according to claim 8 wherein said wall panel has at least one baffle opening in at least one side wall thereof and said combination further includes telephone cables extending from the topside of said ceiling panel through said sleeved aperture in said ceiling panel, said flexible tube and said aperture in the top edge of said wall panel, said telephone cables terminating at said at least one baffle opening in said wall panel.

10. A power panel arrangement according to claim 9 wherein a metal conduit surrounds said electrical conductors and extends from said electrical junction box on said ceiling panel through said flexible conduit and into said wall panel, separating said electrical conductors from said telephone cables.

11. A power panel arrangement according to claim 7 wherein a hollow transition member having a rectangular end defining a rectangular opening at one end and a cylindrical end defining a cylindrical opening at the other end is mounted in the aperture in said top edge of said wall panel, said rectangular end of said transition member communicating with the aperture in the top edge of said wall panel and said cylindrical end receiving one end of said flexible tube.

12. A power panel arrangement according to claim 7 wherein a pair of U-shaped intersecting channel members are disposed within said wall panel forming a box with one corner of said frame in one corner of said hollow wall panel, said at least one power outlet being surrounded by said box.

* * * * *